United States Patent [19]

Issenmann

[11] Patent Number: 4,766,442
[45] Date of Patent: Aug. 23, 1988

[54] ANTENNA STRUCTURE FOR USE WITH A TRANSMITTER LOCATED AT A GREAT DEPTH

[75] Inventor: Olivier Issenmann, Lamorlaye, France

[73] Assignee: Geoservices, La Blanc Mesnil, France

[21] Appl. No.: 53,364

[22] Filed: May 21, 1987

[30] Foreign Application Priority Data

Jun. 12, 1986 [FR] France .................... 8608701

[51] Int. Cl.⁴ .................................... H01Q 1/04
[52] U.S. Cl. ......................... 343/719; 324/333
[58] Field of Search ............ 343/719, 720; 324/332, 324/333, 334

[56] References Cited

U.S. PATENT DOCUMENTS 4,651,100 3/1987 James .................... 343/719

Primary Examiner—William L. Sikes
Assistant Examiner—Robert E. Wise
Attorney, Agent, or Firm—Wenderoth, Lind & Ponack

[57] ABSTRACT

An antenna structure for transmitting signals from a transmitter at the bottom of a drill well to the earth's surface which includes a drill collar extending in an axial direction and which is adapted to support a transmitter therein, a cylindrical metal sleeve for forming part of an antenna for electromagnetic wave transmission, the cylindrical metal sleeve being disposed around the drill collar and adapted to be connected electrically to the transmitter, an insulating sheath between the cylindrical metal sleeve and the drill collar and a plurality of metal rings disposed between each opposite axial end of the cylindrical metal sleeve and confronting opposite axial end of the insulating sheath. The cylindrical metal sleeve has a diameter greater than the diameter of the drill collar and the insulating sheath has an axial length longer than the axial length of the cylindrical metal sleeve. The plurality of metal rings are electrically insulated from each other, from the cylindrical metal sleeve and from the drill collar. The cylindrical metal sleeve includes a plurality of circumferentially extending slots to provide elasticity to the cylindrical metal sleeve so that it will not become separated from the insulating sheath due to bending of the drill collar during drilling.

20 Claims, 3 Drawing Sheets

ANTENNA STRUCTURE FOR USE WITH A TRANSMITTER LOCATED AT A GREAT DEPTH

BACKGROUND OF THE INVENTION

1. Field of the Invention

The present invention is related to an antenna structure intended for use with a transmitter located at a great depth below the earth's surface and which includes a metal sleeve mounted on the outer surface of a drill collar which forms part of a drill string used for petroleum exploration.

2. Description of the Prior Art

In drilling carried out in search of petroleum deposits, it is desirable to transmit to the site control cabin at the earth's surface information supplied by sensors located at the bottom of the drilling well which relates to the pressure at the bottom of the well, the density of the mud, temperature or other useful parameters. Thus, there has been developed a system to transmit signals from a transmitter housed in the drill collar of a drill pipe string. For use as a transmitting antenna, one prior art system utilizes a metal element formed by a portion of an actual drill collar, insulated from the drill collar and connected to it by a mechanical connection element made of insulating material.

Thus, for example, in a thesis submitted to the University of Lille in 1969 by Mr. Clarisse, it was proposed to divide the drill-pipe string, at the level at the last drill collar, into two portions which are separated by a bridge made of insulating material and between which an alternating electrical potential difference of specific frequency is established. The lower part of the drill collar then forms part of an antenna and the upper portion thereof is connected to the upper drill-pipes by means of threaded joints and constitutes an axis which radiates and guides toward the surface of the ground an electromagnetic wave capable of remote transmission of signals supplied by telemetering sensors located at the bottom of the drilling well.

A system of this type is also found in an article entitled "Second-Generation MWD Tool" published on Feb. 21, 1983 in the journal entitled *Oil & Gas Journal*, especially in the last paragraph on page 86 of this publication.

The serious disadvantage of this system is that in order to make an insulating connection between the two metal portions of the drill collar, it is necessary to use a hoop or insulating bridge which reduces the mechanical strength of the drill collar which, as is known, is subjected to considerable torsional and shearing forces.

Another known antenna system includes a metal sleeve made of cut sheet metal or of extremely thick mesh, which is connected in an electrically insulating manner to the drill collar of a drilling string by means of suitable adhesive such as epoxy resin. Thus, the metal sleeve of the antenna is mounted in an insulating manner around the drill collar and is separated therefrom by a layer of bonding material, such as epoxy resin. However, this metal sleeve is subjected to considerable friction at the bottom of a drill hole, particularly from contact with the wall of the well. Thus, it has been found that the sleeve must be made of the same material as the drill collar and must have a sufficient thickness which is close to 1 cm, and at a minimum of approximately 8 mm. The problem with this construction is that the metal sleeve of the antenna is so rigid that it becomes delaminated at opposite axial ends thereof from the drill collar due to strain which results from bending vibrations the drill collar is subject to during drilling. As such, the opposite axial ends of the metal sleeve tend to separate from the adhesive material which causes potential infiltration of the drilling mud between the metal sleeve and the drill collar and in addition causes a loss of electrical insulation.

It is an object of the present invention to provide an antenna structure which retains its resistance to abrasion but yet remains flexible so that it can accommodate the bending stress undergone by the drill collar to which it is attached by a layer of insulating adhesive material.

It is an object of the present invention to provide an antenna structure which includes a metal sleeve forming part of the antenna wherein the opposite axial ends of the sleeve are disposed on the drill collar in such a manner that significant short circuiting of alternating current supplied to the metal sleeve is avoided. To avoid this problem it has been found that the opposite axial ends of the cylindrical metal sleeve forming part of the antenna should be spaced a sufficient distance in the axial direction from the opposite axial ends of the insulating sheath disposed between the cylindrical metal sleeve and the drill collar. Thus, when the cylindrical metal sleeve is mounted in a recess in the outer surface of the drill collar, it has been found that the insulating sheath should extend around 50 cm beyond the opposite axial ends of a cylindrical metal sleeve which may be from 2-6 meters long.

By providing an insulating sheath of sufficient length beyond the opposite ends of the cylindrical metal sleeve, it is possible to minimize the problem of electrical current leakage due to short circuiting through the drilling fluid which circulates in the space between sides of the well and the surface of the drill collar, the drilling fluid characterized by an electrical resistance of generally between 0.3 and 3 ohms/meter. However, since the insulating sheath is necessarily constructed of an insulating material, such as epoxy glue, the exposed portion of the insulating sheath beyond the opposite axial ends of the cylindrical metal sleeve is damaged by abrasion and rubbing against the walls of the well due to its inferior strength and wear resistance compared to the steel drill collar. On the other hand, if the distance that the insulating sheath extends beyond the opposite axial ends of the cylindrical metal sleeve is reduced to several millimeters and if the electrical resistance of the ground across from the cylindrical metal sleeve is relatively high, for example around 100 ohms/meter, nearly all of the current is dissipated in a short circuit with the drill collar, with the result that electromagnetic wave transmission is not possible.

SUMMARY OF THE INVENTION

It is one of the objects of the present invention to reduce the abrasion of the exposed surfaces of the adhesive covering on the drill collar which projects beyond the opposite axial ends of the cylindrical metal sleeve forming part of the antenna.

The above object is achieved by providing a plurality of metal rings between each opposite axial end of the cylindrical metal sleeve and a confronting opposite axial end of the insulating sheath disposed between the cylindrical metal sleeve and the drill collar, the rings being electrically insulated from each other, from the cylindrical metal sleeve and from the drill collar. The metal rings can be insulated from each other and from the drill collar by embedding them in the insulating sheath. The metal rings provide protection against abrasion of the exposed insulating sheath yet do not affect the characteristics of the insulating sheath with respect to its function of preventing current leakage.

Another object of the present invention is to provide sufficient elasticity of the cylindrical metal sleeve such that it follows the bending of the drill collar and prevents it from separating from the insulating sheath securing it to the drill collar. The cylindrical metal sleeve is made elastic by providing a plurality of semi-annular circumferentially extending slots therein. The slots can extend from the radially inner surface of the cylindrical metal sleeve to the radially outer surface thereof or the slots can extend partly through the thickness of the cylindrical metal sleeve. According to one aspect of the present invention, the slots are arranged in a plurality of diametrically opposed pairs with each of the pairs being spaced apart in the axial direction along the length of the drill collar. The pairs of slots can be arranged such that each pair of slots is offset angularly from each adjacent pair of slots. Also, the slots can be arranged such that the ends of every other pair of slots are aligned in the axial direction. According to another aspect of the present invention, each pair of slots can be angularly offset 90° from an adjacent pair of slots. Furthermore, the slots may have a width in the axial direction of about one eighth ($\frac{1}{8}$) the radial thickness of the cylindrical metal sleeve, for example of about 1 mm. Also, each pair of slots can be spaced from an adjacent pair of slots by a distance in the axial direction equal to 40–60 times the width of the slots in the axial direction, such as 30 to 50 mm.

According to another feature of the invention, there can be provided 4–6 metal rings between each opposite axial end of the cylindrical metal sleeve and the corresponding axial end of the insulating sheath. The metal rings can have a width in the axial direction of about 10 cm and can be separated from each other by a distance of about 3 mm.

The present invention provides an improved antenna structure for transmitting signals from a transmitter at the bottom of a drill well to the earth's surface by means of a transmitter disposed in the drill collar and connected to the cylindrical metal sleeve by means of conductors fitted into insulated casings which extend through the drill collar to the cylindrical metal sleeve. The improved antenna structure is achieved by flexibility of the cylindrical metal sleeve and by the prevention of separation of the cylindrical metal sleeve from the insulating sheath, whereby short circuits between the cylindrical metal sheath and the drill collar are avoided.

Another object of the present invention is to provide a method for manufacturing the improved antenna structure. This method involves the use of spacer rings of insulating material disposed at spaced intervals along the axial direction between the cylindrical metal sleeve and the drill collar. The spacer rings may be fitted in spaced-apart circumferentially extending grooves in the drill collar and insulating rings can be provided between the axial ends of adjacent pairs of the metal rings and between the axial ends of the cylindrical metal sleeve and the adjacent metal rings. The method of the present invention also provides a removable casing fitted around the drill collar for confining epoxy resin injected into the spaces between the metal rings and the drill collar as well as the spaces formed by the circumferentially extending slots in the cylindrical metal sleeve and the spaces between the cylindrical metal sleeve and the drill collar.

BRIEF DESCRIPTION OF THE DRAWINGS

The present invention will be described with reference to the accompanying drawings, in which.

DETAILED DESCRIPTION OF THE PREFERRED EMBODIMENTS

Figure 1:
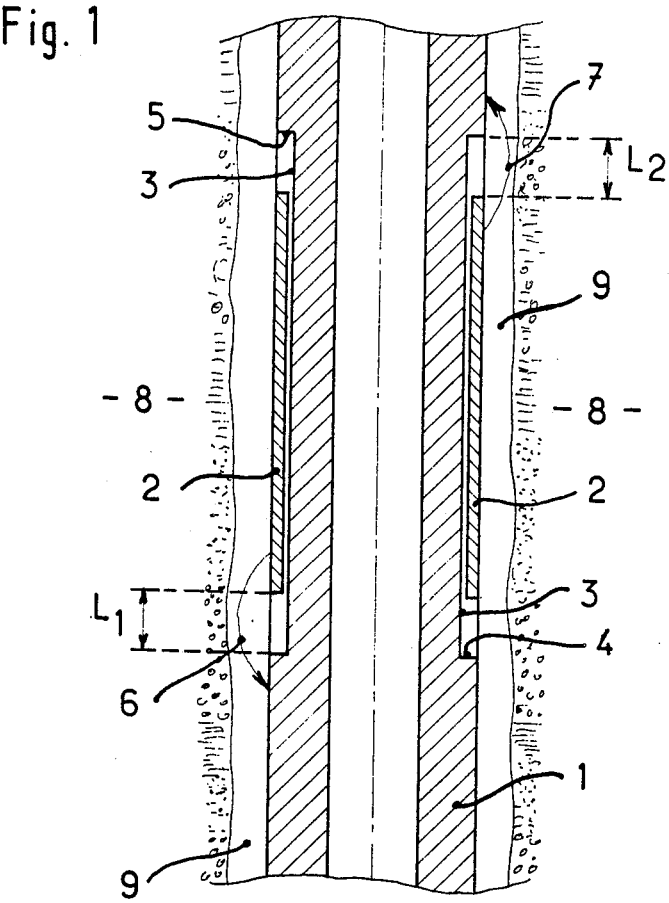
FIG. 1 is a vertical cross-section showing a prior art drill collar in a drill hole, the drill collar including a recess in which is mounted a cylindrical metal sleeve forming part of an antenna and which is mounted to the drill collar by means of an insulating glue.

The present invention is an improvement over the prior art antenna structure shown in FIG. 1 in which a vertical cross-section of a drill collar 1 includes a rigid metal sleeve 2 which is electrically connected by insulated conductors (not shown) to a transmitter device (not shown) housed in the interior of the drill collar 1. The rigid sleeve 2 is made of the same material as the drill collar 1 and is fastened in a recess 3 defined by opposite axial shoulders 4, 5 in the drill collar 1. The sleeve 2 has an inner diameter which is greater than the outer diameter of the drill collar 1 forming the recess 3. The sleeve 2 is spaced from the outer surface of the drill collar defining the recess 3 by a layer of insulating glue (not shown), such as an epoxy resin, which also fills the cylindrical cavity of length L1 defined between the shoulder 4 of the recess 3 and the corresponding axial end surface of the sleeve 2 as well as the cylindrical cavity of length L2 defined between the shoulder 5 and the corresponding axial end surface of the sleeve 2. The sleeve 2 forming part of the antenna is thus completely insulated from the drill collar 1 and separated from the terrain 8 defining the walls of the drill well by an annular space 9 which is filled with drilling fluid. Current leakage occurs between the sleeve 2 and the drill collar 1 as shown by arrows 6 and 7. Thus, in order to prevent short circuiting between the sleeve 2 and the drill collar 1 the leakage current must be reduced to a minimum by maintaining the lengths L1 and L2 at a sufficient value, of, for example 50 cm. This prior art construction does not provide sufficient flexibility of the sleeve 2 and further the exposed portions of the insulating glue are subject to abrasion which eventually leads to wear thereof and eventual increase in leakage current. For instance, if the lengths of the exposed insulating material projecting beyond the axial ends of the sleeve are reduced to several millimeters and if the electrical resistance of the terrain across from the sleeve is relatively high, for example around 100 ohms/meter nearly the entire current is dissipated by a short circuit with the drill collar resulting in loss of the electromagnetic wave transmission.

Figure 2:
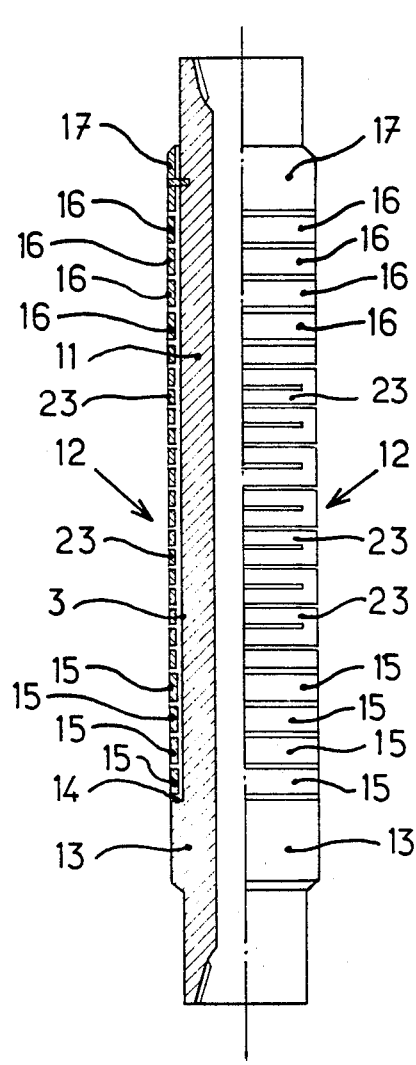
FIG. 2 is a schematic vertical view of a drill collar incorporating the antenna structure of the present invention.

The improved antenna structure according to the present invention is shown in partial cross-section in FIG. 2. The improved antenna structure of the present invention is comprised of a drill collar 11 which extends in a axial direction and which is adapted to support a transmitter (not shown) therein, a cylindrical metal sleeve 12 for forming part of an antenna for electromagnetic wave transmission, the cylindrical metal sleeve being disposed around the drill collar 11 and adapted to be connected electrically to the transmitter, the cylindrical metal sleeve having a diameter greater than the diameter of the drill collar and having an axial length shorter than the axial length of the drill collar, an insulating sheath disposed between the cylindrical metal sleeve 12 and the drill collar 11, the insulating sheath having an axial length longer than the axial length of the cylindrical metal sleeve, and a plurality of metal rings 15, 16 disposed between opposite axial ends of the cylindrical metal sleeve 12 and opposite axial ends of the insulating sheath, the rings being electrically insulated from each other, from the cylindrical metal sleeve and from the drill collar. In order to provide greater flexibility of the cylindrical metal sleeve 12, there is provided a plurality of semi-annular circumferentially extending slots in the cylindrical metal sleeve. The cylindrical metal sleeve 12 provided with the circumferentially extending slots will be described in greater detail with reference to FIGS. 3-5.

As shown in FIG. 2, the drill collar 11 includes a cylindrical reinforcement 13 formed by an expanded diameter portion of the drill collar 12, the cylindrical reinforcement 13 having an upper axial end forming a lower shoulder 14 of the recess 3 in which the cylindrical metal sleeve 12 and the metal rings 15, 16 are received. The metal rings are arranged such that a first plurality of metal rings 15 are disposed between one axial end of the cylindrical metal sleeve and the shoulder 14 and a second plurality of metal rings 16 are disposed between the other axial end of the cylindrical metal sleeve 12 and an upper fastening collar 17 removably fitted to the drill collar 12 by suitable means, such as screws. The insulating sheath bonding the cylindrical metal sleeve 12 and the metal rings 15, 16 to the drill collar 11 can comprise an epoxy resin which penetrates the interstices separating the metal rings from each other and from the cylindrical metal sleeve as well as the spaces formed by the circumferentially extending slots in the cylindrical metal sleeve. As such, separation of the resin joined to the drill collar 11 is prevented and the metal rings 15, 16 prevent separation and wear due to abrasion of the exposed insulating resin which extends beyond the opposite axial ends of the cylindrical metal sleeve. Thus, the improved antenna structure of the present invention prevents penetration of the drilling mud beneath the cylindrical metal sleeve or beneath the insulating sheath and thereby prevents short circuiting between the cylindrical metal sleeve and the drill collar.

The upper fastening collar 17 comprises a means on the drill collar for axially sliding the plurality of metal rings 15, 16 and the cylindrical metal sleeve 12 onto the drill collar. Thus, with the fastening collar 17 removed, the lower metal rings 15 can be slid onto the drill collar followed by the cylindrical metal sleeve 12 and the upper metal rings 16. According to one embodiment of the present invention, the number of first metal rings 15 can be 4 to 6 and the number of the second plurality of rings 16 can be 4 to 6. The metal rings 15, 16 can each have a width in the axial direction of from 8 to 10 cm and the interstices separating the rings from each other can be 1 to 3 mm.

Figure 3:
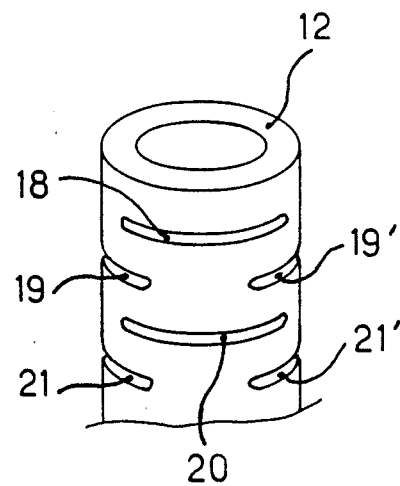
FIG. 3 is a partial perspective view of the cylindrical metal sleeve forming part of the antenna structure of the present invention.
Figure 4:
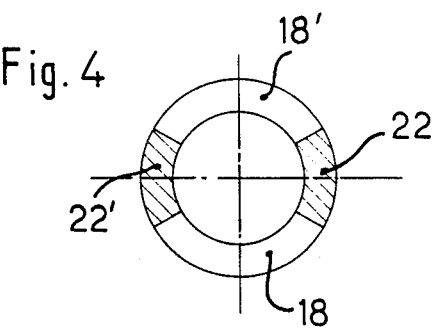
FIG. 4 is a cross-section of the cylindrical metal sleeve shown in FIG. 3.
Figure 5:
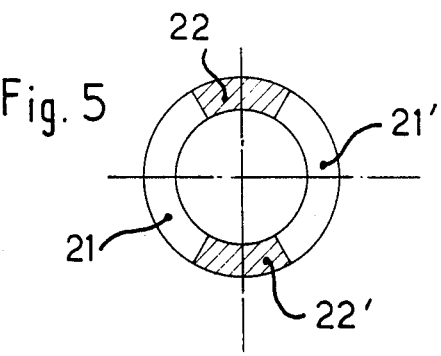
FIG. 5 is a cross-section similar to that of FIG. 4 but taken at a different point along the length of the cylindrical metal sleeve.

The circumferentially extending slots will now be described with reference to FIGS. 3-5. As shown in FIG. 3, the plurality of slots are arranged in a plurality of diametrically opposed pairs with each of the pairs being spaced apart in the axial direction. Also, each pair of slots can be offset angularly from each adjacent pair of slots and the ends of every other pair of slots can be aligned in the axial direction. In particular, FIG. 3 shows only one slot 18 of a pair of slots and the axial ends of the slot 18 are aligned in the axial direction with the ends of another slot 20. A pair of slots 19, 19' are spaced axially between the slots 18 and 20 and are angularly offset therefrom. The ends of the slots 19, 19' are aligned in the axial direction with the ends of another pair of slots 21, 21'. As shown in FIG. 2, the circumferentially extending slots form a plurality of semi-annular rings 23 connected together by axially extending bridges 22, 22', as shown in FIGS. 4 and 5. Although the slots can extend from the radially inner surface of the cylindrical metal sleeve to the radially outer surface thereof, it is possible to provide slots which extend only partly through the thickness of the cylindrical metal sleeve. However, the distance that the grooves extend in the circumferential direction is limited to provide connecting bridges of sufficient length in the circumferential direction to provide resistance to shearing due to bending of the drill collar.

FIG. 4 is a cross-section taken in a plane perpendicular to the axial direction and passing through slot 18 and as can be seen, a slot 18' is diametrically opposed to the slot 18. Likewise, a bridge 22' is diametrically opposed to the bridge 22. FIG. 5 is a view similar to that shown in FIG. 4, except that FIG. 5 is cross-section taken through the pair of slots 21, 21'. As can be seen, a pair of bridges 22, 22' separate the ends of the slots 21, 21'.

Figure 9:
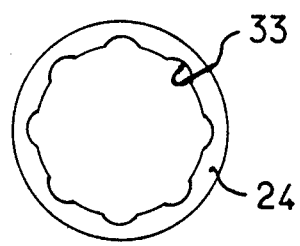
FIG. 9 is a top view of a ring made of insulating material, according to the present invention, which is used to separate the cylindrical metal sleeve from the drill collar and which includes a plurality of recesses extending between opposite axial ends thereof for passage of glue along the axial length of the drill collar when the cylindrical metal sleeve and the metal rings are bonded to the drill collar by the method of the present invention.
Figure 6:
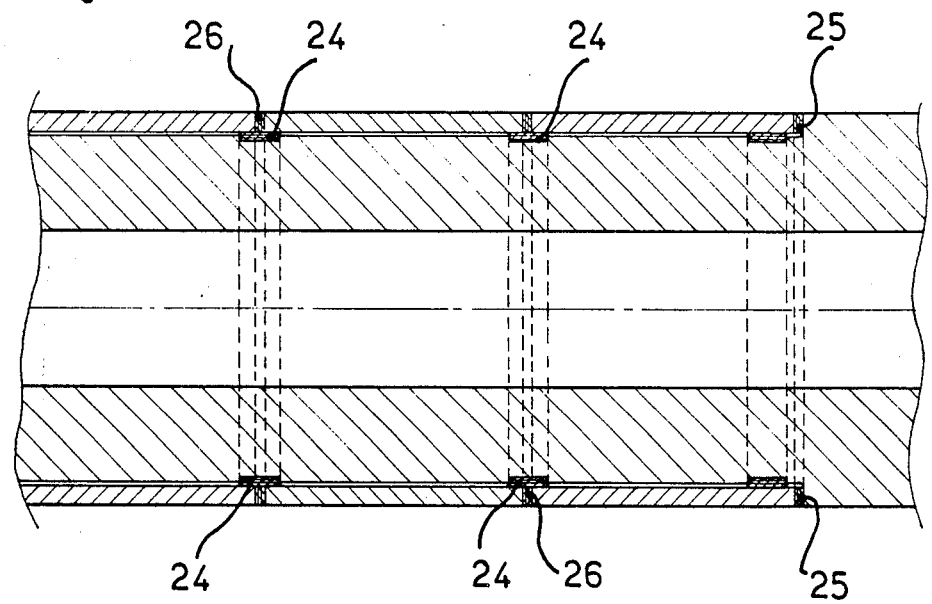
FIG. 6 is a horizontal cross-sectional view of the metal rings of the present invention, the metal rings being disposed between one axial end of the cylindrical metal sleeve and a shoulder on the drill collar.

The following description relates to a preferred method of mounting the metal rings 15, 16 and the cylindrical metal sleeve 12 to the drill collar 11. In order to maintain the rings 23 of the cylindrical metal sleeve 12 and the metal rings 15, 16 concentric with the outer surface of the drill collar 11, there are provided a plurality of spacer rings 24 of insulating material disposed at spaced intervals along the axial direction of the drill collar. The spacer rings 24 can be made of plastic material and can be fitted in correspondingly shaped grooves in the drill collar. The plastic spacer rings 24 allow the metal rings 15, 16 and the cylindrical metal sleeve 12 to be spaced from the outer surface of the drill collar by a distance as small as 1 mm. The spacer rings 24 can be disposed at spaced intervals along th axial direction and fitted between the cylindrical metal sleeve and the drill collar at positions corresponding to the circumferentially extending slots. In addition, the spacer rings 24 can be disposed at positions corresponding to adjacent axial ends of the metal rings 15, 16 as well as positions corresponding to the opposite axial ends of the cylindrical metal sleeve. As shown in FIG. 6, one of the spacer rings 24 can be provided at a position corresponding to the end of the metal ring facing the shoulder 14 and likewise, one of the spacer rings 24 can be provided adjacent the axial end of the metal ring facing the fastening collar 17. In addition to the spacer rings 24, insulating rings 25 are provided between the axial end of the metal ring 15 facing the shoulder 14 as well as between the axial end of the metal ring 16 facing the fastening collar 17. As shown in FIG. 6, washers 26 are provided between the adjacent axial ends of the metal rings 15, 16. The insulating rings 25 can be made of any appropriate plastic material and the washers 26 can be made from an elastomer, such as a material known under the Trademark VITON. As shown in FIG. 9, the spacer rings 24 include a plurality of recesses 33 therein which extend between opposite axial ends thereof for passage of glue or other material forming the insulating sheath when such material is injected between the cylindrical metal sleeve 12 and the outer surface of the drill collar and also allows the passage of such material between the metal rings 15, 16 and the outer surface of the drill collar 11.

Figure 7:
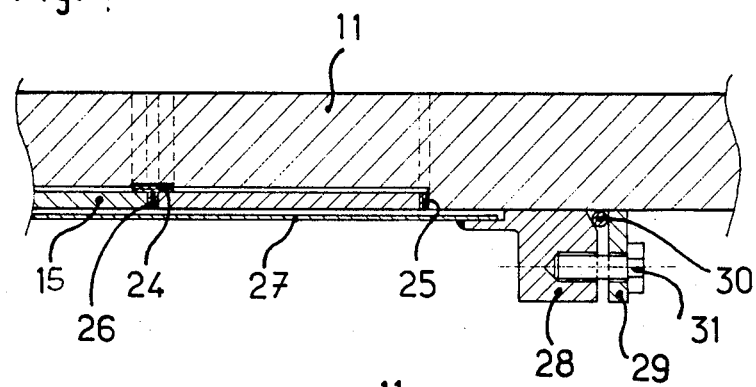
FIG. 7 is a partial cross-sectional view taken along the axial length of the drill collar and showing a casing according to the present invention used for confining insulating glue around the antenna structure of the present invention.
Figure 8:
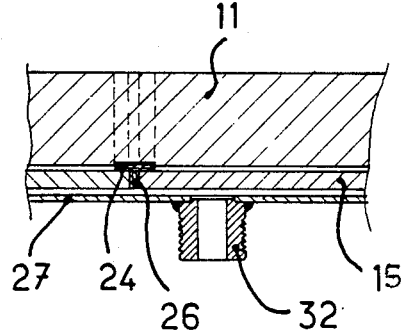
FIG. 8 is a horizontal cross-sectional view taken along the axial length of the drill collar and showing a nozzle attached to the casing of the present invention which is used to create a vacuum or to inject glue in and around the metal rings and cylindrical metal sleeve of the present invention.

A preferred method of bonding the rings 15, 16 and the cylindrical metal sleeve 12 with its rings 23 in an insulating manner in the recess 3 of the drill collar 11 will be described as follows. After the metal rings 15, 16 and the cylindrical metal sleeve 12 have been fitted in the recess 3 of the drill collar, the fastening collar 17 is secured to the drill collar. Then, the metal rings 15, 16 and the cylindrical metal sleeve 12 are covered with a casing cylinder 27 with a space therebetween. The casing cylinder 27 can be made of sheet metal, such as zinc, and the casing has a larger interior diameter than the outer diameter of the cylindrical metal sleeve 12 and the metal rings 15, 16. The sheet metal can be joined by soft soldering to form the casing cylinder 27 or sheets of sheet metal can be attached to two longitudinal clamps by suitable means, such as by screwing the sheets to the clamps. The opposite axial ends of the zinc casing cylinder 27 are each soldered to a ring 28 which forms a close fit with the outer surface of the drill collar 11. The ring 28 is sealed to the outer surface of the drill collar 11 by means of a second ring 29 and an impermeable toric joint 30 which is fitted between a cam surface on the ring 28 and a flat surface on the ring 29, the ring 29 being tightened against the ring 28 with the impermeable toric joint 30 therebetween by suitable means, such as by screws 31, as shown in FIG. 7. The casing cylinder 27 includes radially outwardly extending nozzles 32 which are used for creating a vacuum to aspirate epoxy resin from a suitable storage container such that the epoxy resin is injected into all of the spaces between the various assembled metal components. The nozzles 32 can be attached to the cylindrical casing 27 by soldering or other suitable means. The semi-circular shaped recesses 33 in the spacer rings 24 allow the epoxy glue to spread along the drill collar 11 and between the drill collar 11 and the cylindrical metal sleeve as well as the metal rings 15, 16. When the bonding step is completed, the fastening clamps are loosened or the longitudinal soldered joint of the cylindrical casing 27 is destroyed to thereby remove it from the drill pipe 11. Subsequently, the usual finishing procedures such as polishing and balancing of the drill pipe can be performed.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein. For example, while each pair of slots is shown as angularly offset by 90° from an adjacent pair of slots, each pair of slots can be offset with a different angular orientation from each adjacent pair of slots. Also, the distance between the circumferentially extending slots and the distance between the adjacent ends of the metal rings 15, 16 can be different from those values specifically described in the specification.

I claim:

1. An antenna structure for transmitting signals from a transmitter at the bottom of a drill well to the earth's surface including means for transmitting signals from the transmitter at the bottom of the drill well to the earth's surface, said means comprising:

a drill collar which extends in an axial direction and which is adapted to support a transmitter therein;

a cylindrical metal sleeve for forming part of an antenna for electromagnetic wave transmission, said cylindrical metal sleeve being disposed around said drill collar and adapted to be connected electrically to the transmitter, said cylindrical metal sleeve having a diameter greater than the diameter of said drill collar and having an axial length shorter than the axial length of said drill collar;

an insulating sheath disposed between said cylindrical metal sleeve and said drill collar, said insulating sheath having an axial length longer than the axial length of said cylindrical metal sleeve; and a plurality of metal rings disposed between each opposite axial end of said cylindrical metal sleeve and a confronting opposite axial end of said insulating sheath, said rings being electrically insulated from each other, from said cylindrical metal sleeve and from said drill collar.

2. The antenna structure of claim 1, wherein said plurality of metal rings have an inner surface thereof spaced radially outwardly from an adjacent outer surface of said drill collar and said plurality of metal rings are embedded in said insulating sheath.

3. The antenna structure of claim 1, further comprising means on said drill collar for axially sliding said plurality of metal rings and said cylindrical metal sleeve on said drill collar, said means comprising a movable collar slidable on said drill collar from one axial end thereof, said movable collar being fixedly secured to said drill collar with a first plurality of said metal rings disposed between said one axial end of said cylindrical metal sleeve and an axial end of said movable collar.

4. The antenna structure of claim 1, wherein said cylindrical metal sleeve includes a plurality of semiannular circumferentially extending slots therein, said slots extending from the radially inner surface of said cylindrical metal sleeve to the radially outer surface thereof to thereby improve the elasticity of said cylindrical metal sleeve.

5. The antenna structure of claim 4, wherein said plurality of slots are arranged in a plurality of pairs of diametrically opposed slots with each of said pairs being spaced apart in said axial direction.

6. The antenna structure of claim 5, wherein each pair of slots is offset angularly from each adjacent pair of slots.

7. The antenna structure of claim 5, wherein ends of every other pair of slots are aligned in said axial direction.

8. The antenna structure of claim 5, wherein each pair of slots is angularly offset 90 degrees from an adjacent pair of slots.

9. The antenna structure of claim 5, wherein each pair of slots is spaced from an adjacent pair of slots by a distance in said axial direction equal to 40–60 times the width of said slots in said axial direction.

10. The antenna structure of claim 4, wherein said slots have a width in said axial direction of about one-eighth the radial thickness of said cylindrical metal sleeve.

11. The antenna structure of claim 4, wherein said insulating sheath comprises an adhesive material extending between axial end surfaces of said slots and between axial end surfaces of said metal rings, said adhesive material also extending between the inner surface of said cylindrical metal sleeve and the outer surface of said drill collar as well as between the inner surface of each of said metal rings and the outer surface of the drill collar.

12. The antenna structure of claim 4, further comprising spacer rings of insulating material disposed at spaced intervals along said axial direction and fitted between said cylindrical metal sleeve and said drill collar, said drill collar including spaced-apart circumferentially extending grooves each of which is radially aligned with a respective one of said slots, said spacer rings being disposed in said grooves.

13. The antenna structure of claim 1, wherein a first plurality of metal rings are disposed between one axial end of said cylindrical metal sleeve and the corresponding one axial end of said insulating sheath and comprise 4–6 in number and a second plurality of metal rings are disposed between the other axial end of said cylindrical metal sleeve and the corresponding other axial end of said insulating sheath and comprise 4–6 in number, said metal rings having a width in said axial direction greater than the distance separating adjacent ones of said metal rings.

14. The antenna structure of claim 1, wherein said drill collar includes an annular shoulder extending radially outward from an outer surface of said drill collar on which said cylindrical metal sleeve and said plurality of metal rings are mounted.

15. The antenna structure of claim 1, wherein said cylindrical metal sleeve includes a plurality of semiannular circumferentially extending slots therein, said slots extending partly through the thickness of said cylindrical metal sleeve.

16. The antenna structure of claim 1, further comprising spacer rings of insulating material disposed at spaced intervals along said axial direction between said cylindrical metal sleeve and said drill collar.

17. The antenna structure of claim 16, wherein said drill collar includes spaced-apart circumferentially extending grooves, each of said spacer rings being disposed in a respective one of said grooves.

18. The antenna structure of claim 16, wherein said spacer rings include at least one recess therein extending between opposite axial ends thereof.

19. The antenna structure of claim 1, further comprising washers of an elastomer material disposed between at least one adjacent pair of said metal rings.

20. A method of making an antenna structure for transmitting signals from a transmitter at the bottom of a drill well to the earth's surface comprising:
  providing a drill collar which extends in an axial direction and which is adapted to support a transmitter therein;
  mounting a cylindrical metal sleeve for forming part of an antenna for electromagnetic wave transmission around said drill collar, said cylindrical metal sleeve having a diameter greater than the diameter of said drill collar and having an axial length shorter than the axial length of said drill collar;
  mounting a plurality of metal rings between each opposite axial end of said cylindrical metal sleeve and a confronting axial end of a recess in said drill collar such that said rings are electrically insulated from each other, from said cylindrical metal sleeve and from said drill collar;
  covering said metal rings and said cylindrical metal sleeve with a casing means sealed to the outer surface of said drill collar for molding an insulating material on said drill collar;
  injecting an insulating, adhesive material into spaces between said metal rings, said cylindrical metal sleeve, said drill collar and said casing means; and
  removing said casing means from said drill collar.

* * * * *